United States Patent Office 3,446,174
Patented May 27, 1969

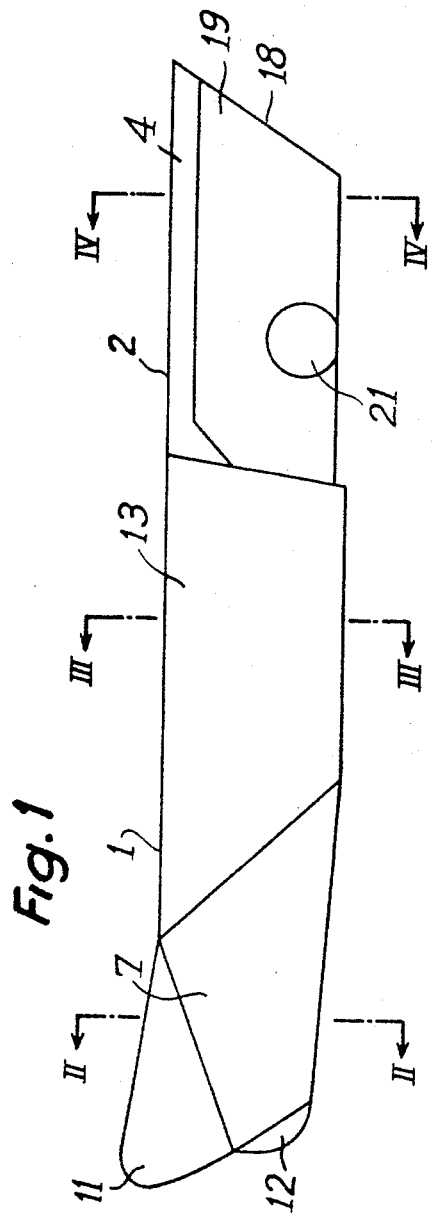
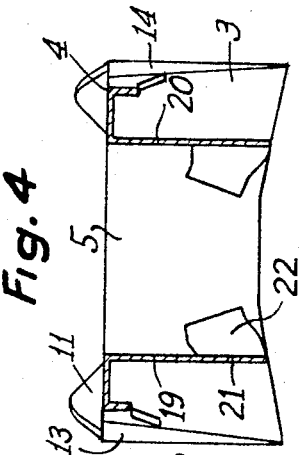
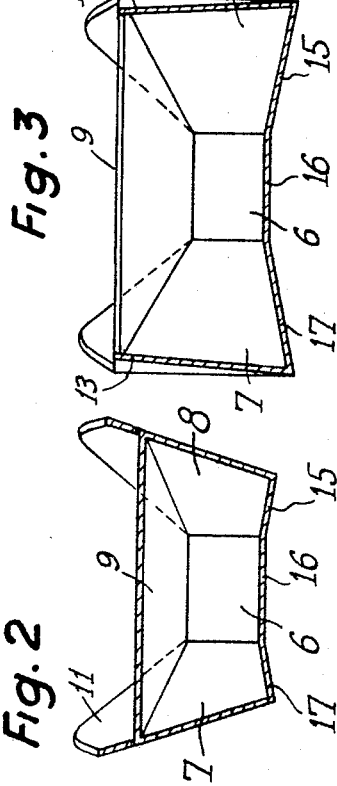

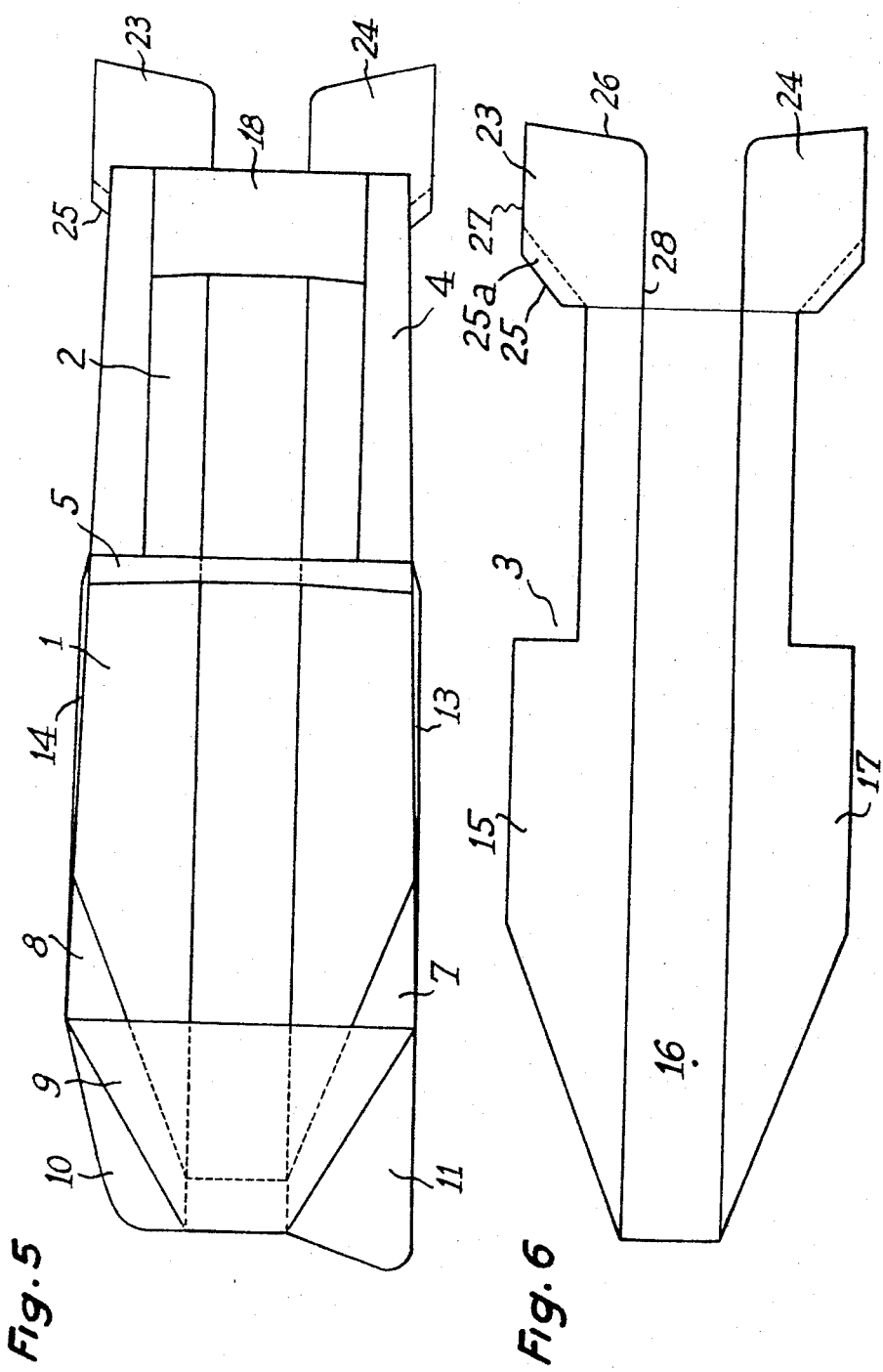

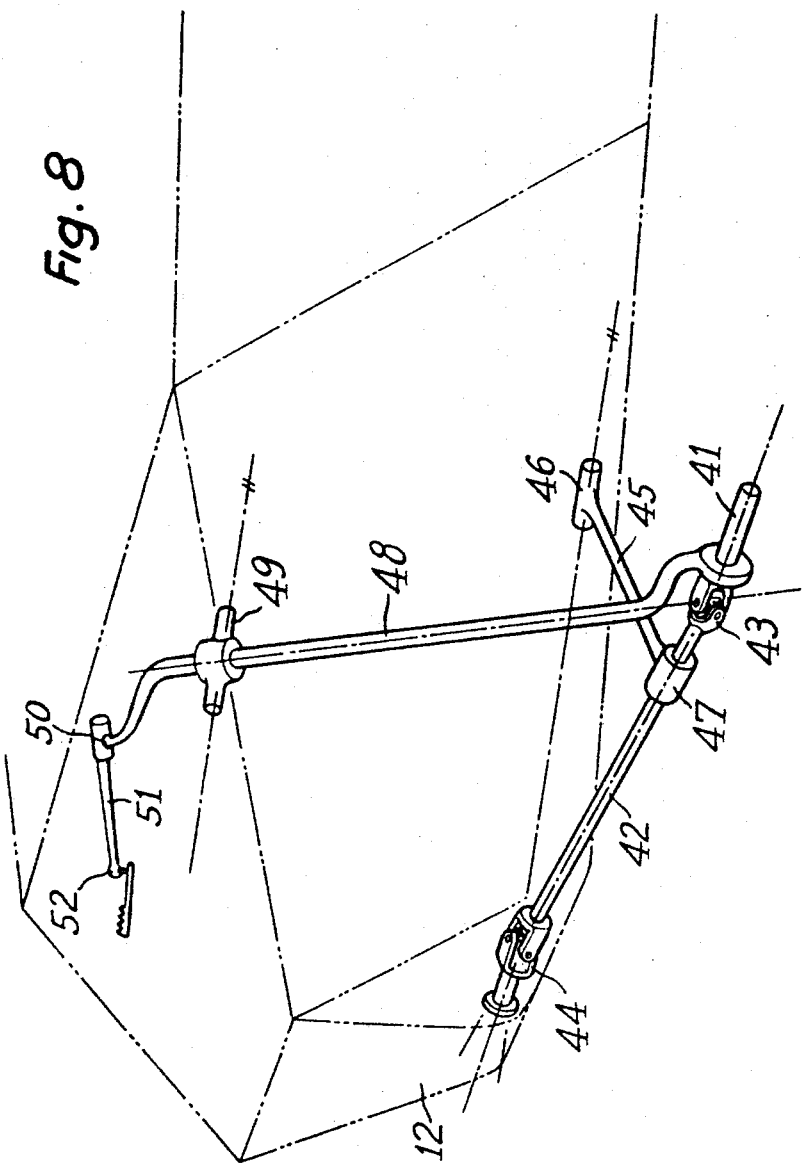

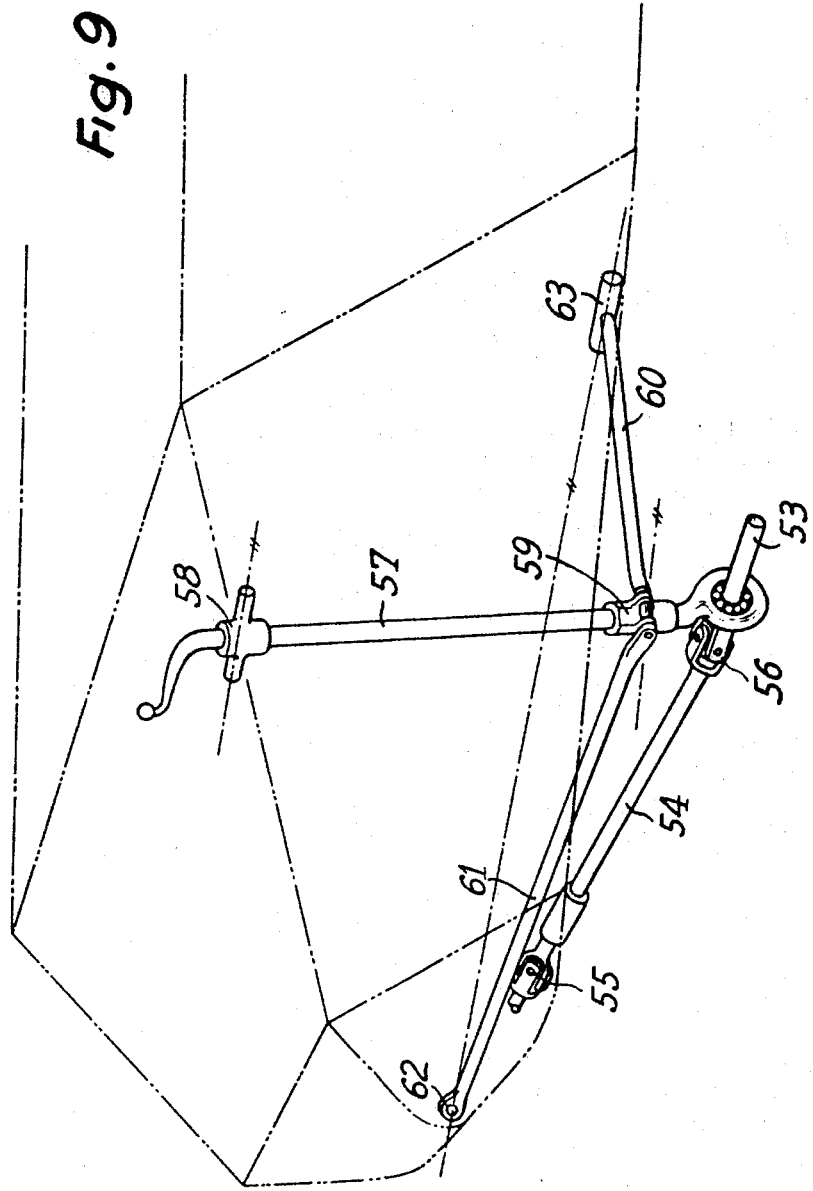

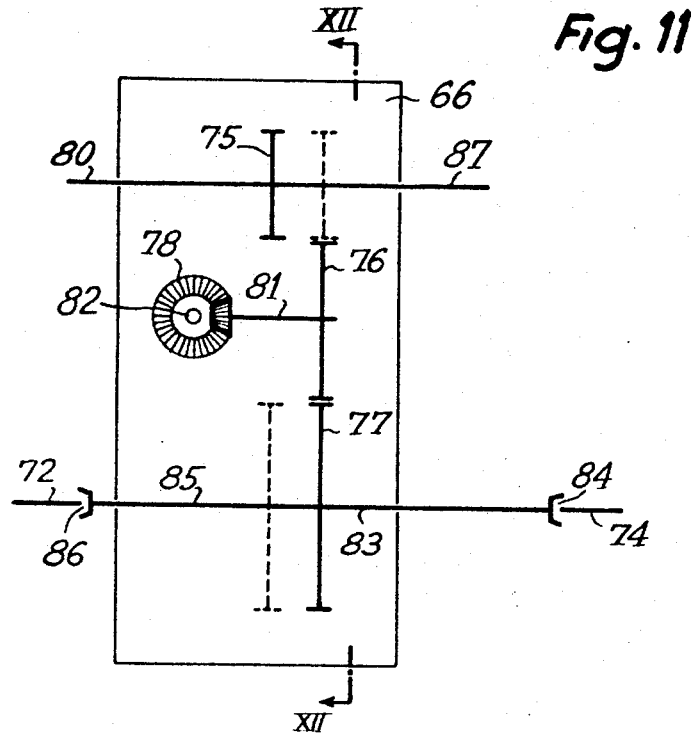
Fig. 11
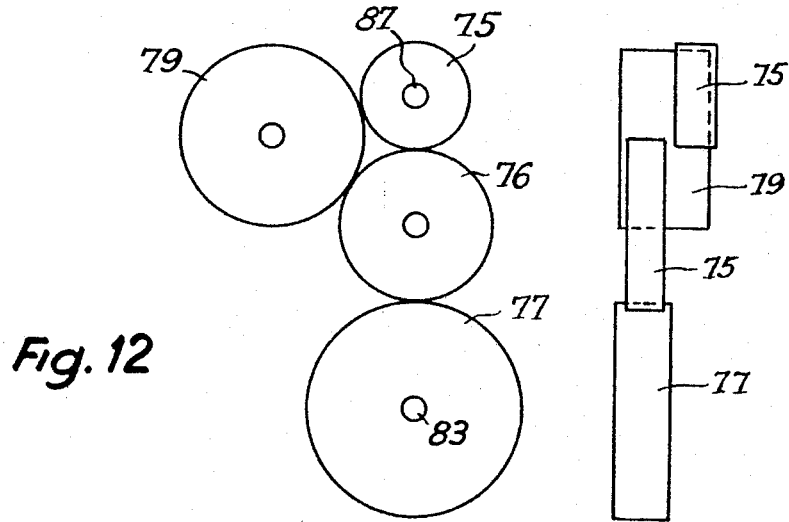
Fig. 12
Fig. 12a

3,446,174
AMPHIBIOUS VEHICLES
Louis Henri Denis Marie Ballu, "Champfleury," Epernay,
Marne, France
Filed Feb. 20, 1967, Ser. No. 617,387
Claims priority, application France, Feb. 18, 1966,
50,339
Int. Cl. B60f 3/00
U.S. Cl. 115—1         8 Claims

ABSTRACT OF THE DISCLOSURE

The present invention relates to amphibious vehicles of the kind having a body with mountings for front and rear wheels and according to the invention the mountings for the rear wheels are accommodated in housings of appropriate size, so that these wheels can be raised or lowered while still remaining in the same plane. The front wheels are provided with means for raising them with a composite rotational movement to apply them against the inclined body parts. The invention also provides means for raising and lowering these rear wheels.

The present invention relates to amphibious vehicles, which as will be apparent, can move over both ground and water. Since their desiderata when used as an automobile differ very much from those upon which their nautical qualities depend, no real compatibility of the two has obtained up to the present time, and the design ideals fall between two stools. As a boat they are clumsy and awkward to control and their efficiency as a road vehicle is impaired, by the addition of elements necessary to ensure that they can float.

An object of the present invention is a vehicle for both civil and military use which combines nautical qualities and automobile qualities. It is a further object to provide an improved amphibious vehicle. Other objects and advantages will become apparent in the description which is to follow.

The invention consists in an amphibious vehicle including a body having mountings for front wheels and rear wheels, wherein the mountings for the rear wheels are accommodated in housings of appropriate size to allow the rear wheels to be raised and lowered whilst remaining in the same plane, means being provided for effecting the raising and lowering movements, said body having a front end with inclined parts, and wherein means are provided to raise the front wheels with a composite rotational movement to apply said front wheels against said inclined body parts.

In order that the invention may be more clearly understood, reference will now be made to the accompanying drawings which show one embodiment hereof, in schematic form, by way of example, and in which:

FIGURE 1 shows a side view of an amphibious vehicle according to the invention,

FIGURE 2 shows a section along the line II—II of FIGURE 1,

FIGURE 3 shows a section along the line III—III of FIGURE 1,

FIGURE 4 shows a section along the line IV—IV of FIGURE 1,

FIGURE 5 shows a plan view of the vehicle according to the invention,

FIGURE 6 shows the base of the vehicle of FIGURE 1 seen in plan view,

FIGURE 8 shows a view in perspective of one embodiment of the front wheels parking system, FIGURE 9 shows another embodiment thereof, FIGURE 11 shows a diagram of a suitable gear box or transfer box, and FIGURES 12 and 12a show sections in perpendicular planes along the line XII—XII of FIGURE 11.

In all these figures, identical reference numerals designate identical elements.

Figure 7:
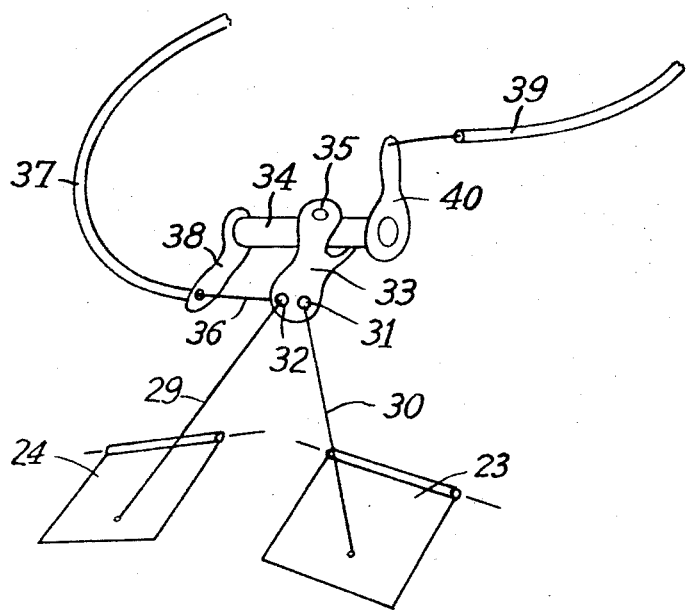
FIGURE 7 shows a system of controlling the deflectors.

The body of the vehicle, which itself does not include a conventional chassis, is self-supporting and has neither break of continuity nor movable parts; this allows it to be efficiently sealed and has an excellent rigidity which is further increased by the choice of its shapes, as will be seen in the following. This body constitutes the hull of the boat, which becomes the vehicle when it is moved over ground, and consequently we shall use the expressions "body" or "hull" equally for designating it and other terms will be used which are often used in nautical construction.

The body is made of thick sheet or plate (0.4 to 0.5 centimeter) in a light alloy; in fact the use of thick sheets or plates gives, with an equivalent weight, a greater resistance than that given by thin plates (made of steel or a light alloy) stiffened by added elements. The body is preferably formed by an assembly of flat or developable surfaces, this facilitating its manufacture and possible enabling a sheeting to be produced by adhering plates made of a hard steel which is difficult to mould.

The body comprises two completely separate compartments; the front compartment 1 is the compartment for the crew and personnel and the rear compartment 2, narrower than the front compartment, is the compartment for the engine. Due to this arrangement, the centre of gravity is situated towards the rear, this on ground being favourable for the road holding of the rear wheels, which are driven, and on water facilitates lifting of the prow.

From the difference in width between the engine compartment and the front compartment there results a recess 3 in which the rear wheels are housed and which gives certain navigational advantages. The upper part of the recess is covered by mudguards 4.

The two front and rear compartments are completely separated by a plate 5 which, for the comfort of the passengers, can be slightly inclined. The upper part of the engine compartment is preferably closed and is sealed, the admission of air as well as the escape of the gases then being effected through pipes like "snorkels" which can be usefully and easily merged with hood-holding irons.

The front of the body or prow is formed by three flat surfaces: a surface 6 situated at the front of the vehicle, inclined forwardly and perpendicular to the plane of symmetry of the vehicle, two surfaces 7 and 8 symmetrical with respect to the plane of symmetry of the vehicle, inclined with respect to this plane and to the horizontal so as to shed the water when the vehicle moves over water.

As will be seen in the following, the particular shape of the base renders the lower edges of the surfaces 7 and 8 slightly inclined to the horizontal, this being desirable for the convenient flow of the parted water and for the nautical movements of the vehicle.

The bonnet 9 slopes downwardly, this giving the driver an excellent visibility at the front when driving over ground.

At the front, the vehicle has two wings 10 and 11 which are articulated about the upper edges of the surfaces 7 and 8. As a road vehicle these wings are put in low position (wing 10 of FIGURE 5) and form mudguards for the front wheels; as a boat, they are placed into a high position (wing 11 of FIGURES 1 and 5) and form a coaming.

A casing 12 applied to the surface 6 protects the components of the mechanical transmission at the front which will be described later and constitutes a stem in a shape which divides the waves.

The two flanks 13 and 14 constitute, with the stem and with a part of the base which will be described hereinafter, the compartment 1 for the crew and personnel. The flanks are slightly inclined towards the inside so that the hull is frigated; moreover, its width slightly decreases towards the rear, the midships frame generally being situated just after the stem.

This improves the nautical qualities, and, moreover, the fact that the width of the vehicle decreases from the front to the rear prevents the vehicle from jamming between two obstacles when it is driven over ground.

The base has a concave shape and constitutes a kind of arch. In the embodiment, and for ease of manufacture, it is constituted by the three flat surfaces 15, 16, 17, the central flat surface 16 being horizontal and the two side surfaces 15 and 17 being slightly downwardly inclined, but the majority of the results indicated above would also be obtained by adopting another concave shape, for example a part-cylinder.

This concave shape increases the rigidity of the body and the central ground protection of the vehicle. Moreover, it has been ascertained that it considerably increases the nautical qualities, particularly by facilitating the lift at the prow and by improving the directional holding and stability.

In horizontal projection, as is clearly shown in FIGURE 6 the base is formed of a delta shaped part at the front followed by a rectangular part which is notably narrower than the front part; the difference in width of the front and the rear produces, when the vehicle moves in water, a stepped effect over a large length of flow and the wetted surface is reduced. The shape of the base increases the efficiency when the vehicle moves in water.

Moreover, the concave shape of the base causes the favourable inclination of the lower part of the stem whose external edges are formed by the intersection of the planes of the surfaces 7 and 8 with the planes of the surfaces 17 and 15.

The rear face 18 of the engine compartment constitutes the rear board or transom of the hull; it is inclined by about 60° to the horizontal, this facilitating the clearance of the banks when the vehicle leaves the water.

The lateral faces 19 and 20 of the engine compartment are apertured at 21 to allow the rear drive shaft to pass through and which will be described in the following. Gaiters 22 made of rubber or any other suitable material ensure a good seal for the shafts.

Thus the body of the vehicle according to the invention presents numerous advantages over known bodies, such as ease of manufacture, great rigidity, sure passage between close obstacles, improved ground protection, good visibility at the front; it therefore constitutes an excellent boat hull when the vehicle moves over water.

Thus it is that, in water, the vehicle lifts up at low speed and consequently it reaches high speeds although using relatively low power.

The nautical qualities of the body can be further improved and its prow lifting facilitated by placing at the rear two deflectors 23 and 24 such as those shown in FIGURE 6.

These deflectors are articulated to the edges formed by the intersection of the rear face 18 of the engine compartment with the lateral surfaces 15 and 17 of the base which are inclined with respect to the horizontal, so that, when they are completely raised up, they are applied against the rear face 18 of the engine compartment and that, when they are lowered as much as possible, they form with the external faces of the surfaces 15 and 17 of the base a dihedron whose angle is obtuse.

As is shown in FIGURE 6, the edges 25 and 26 of the deflectors are preferably inclined so that, despite the inclination of their hinge with respect to the horizontal, they are rapidly in contact with the water over a considerable length when they are lowered and the part 25a which is close to the edge 25 is raised upwardly in order to decrease the water flow.

These deflectors which act somewhat in the manner of the tail planes of an airplane, facilitate the lifting of the hull and permit maximum acceleration or deceleration.

When the vehicle moves over ground, the deflectors, raised against the rear face of the engine compartment, do not increase the bulk of the vehicle and, closing off the recesses 3 of the rear wheels, act as drip-flaps against thrown-up matter.

When the vehicle moves over water, the deflectors are progressively lowered, this increasing the lift of the hull, facilitating its lifting up and improving its directional stability.

According to a particular embodiment, each deflector is controlled separately and independently of the other like co-operating rudders to steer the vehicle.

A control system for this purpose is schematically shown in FIGURE 7. By means of a ball-and-socket joint (not shown in the figures), each deflector is connected to a rod. The two rods 29 and 30 are also connected, by means of ball-and-socket joints 31 and 32, to a fork 33 so that the transverse movements of the fork 33 bring about vertical movements, of the same amplitude but of opposite directions, of each of the deflectors, and the vertical movements of the fork 33 bring about vertical movements, of the same amplitude and direction, of each of the deflectors.

The fork 33 is fixed to a shaft 34, for example by means of another shaft 35, so that it is capable of transverse movements independently of the shaft 34 and so that it is driven by the rotary movements of the shaft 34 on itself which thus cause the vertical movements, equal and of the same direction, of each of the two reflectors.

The transverse movements of the fork 33 are produced by a rod 36 fixed on the one hand to the fork and on the other hand to a cable contained in the sheath 37. The latter is supported on and fixed to the part 38 which is itself fixed to one end of the shaft 34, so that the rod 36 is always in the plane determined by the shaft 34 and the fork 33.

The movements of the shaft 34 when it rotates on itself, thus the vertical movements of the fork 33, are produced by the action of the cable contained in the sheath 39 on a part 40 fixed to the other end of the shaft 34.

The sheaths 37 and 39 extend to the driver's cabin of the vehicle and the cables which they contain are controlled for example by a device similar to the joystick of an aircraft.

In order that, when the vehicle moves over water, the body shall have all the necessary nautical qualities, means which permit the front and rear wheels to be raised so that they completely leave the water, are provided. By way of illustration two assemblies which permit the front wheels to be raised are indicated hereinbelow.

The rear wheels can be raised whilst remaining in their normal plane due to the recesses 3 of the body which permit this movement and have moreover the other advantages mentioned previously. This may be obtained by connecting the suspension bar of the rear wheels to a shaft which can be rotated on itself in any desired position.

It will also be noted that due to the position of the rear wheels, in the recesses 3 of the body, the wheel may be raised only up to the height of the base of the hull, which proves to be satisfactory arrangement.

On the other hand, the front wheels are completely raised up and are applied against the body, above the water line.

FIGURE 8 schematically shows, viewed in perspective, a front wheel parking assembly which permits a suitable raising of the front wheels.

As was indicated previously, 12 represents the casing of the front axle which will be described later.

The spindle of stub axle 41 of the wheel is driven by a shaft 42 provided with two universal joints 43 and 44; the shaft 42 is held by a cross piece 45 which is fixed to the hull by a bearing 46 in which it can rotate and to the shaft 42 by a bearing 47 in which the shaft 42 can rotate without sliding. By construction, the axis of the bearing 46 passes through the centre of the universal joint 44.

A pivot 48 of the spindle 41 is preferably situated in a plane perpendicular to the axis of the bearing 46 and it passes through a bearing 49, turning about an axis parallel to that of the bearing 46, fixed near the upper edge of the prow. Reference numeral 50 designates a guiding crank pin and reference numeral 51 a guiding half coupling bar.

The shafts 42 and 45 are made to rotate by any means, for example, by means of cables, about the axis of the bearing 46 passing through the centre of the universal joint 44.

During this movement, the universal joint 43 describes a circle situated in a plane perpendicular to the axis of the bearing 46; the spindle pivot 48 which by construction, is situated in this plane, remains there by sliding in the bearing 49 which oscillates about its axis, which is parallel to the axis of the bearing 46.

The shaft 42, the crosspiece 45, the universal joint 43, the spindle pivot 48 as well as the wheel are positioned against the body, the wheel, which remains substantially parallel to the spindle pivot, being inclined downwardly.

During the upward rotational movement of shafts 42 and 45, the guiding crank pin 50 is raised and due to its connection with the half coupling bar 51 which rotates about the fixed point 52, causes the rotation of the spindle pivot 48 on itself and sliding in bearing 49, this producing a forwards inclination of the wheels, which, when the rotary movement given to the shaft 42 is complete, are thus substantially positioned against the wall of the body (wall 7 of FIGURE 1).

It may be desired or necessary to place the spindle pivot 48 in a plane which is not exactly perpendicular to the axis of the bearing 46. In this case, the bearing 50 will be placed on a ball-and-socket joint instead of oscillating about an axis.

FIGURE 9 shows another front parking assembly which is a modification of the assembly shown in FIGURE 8.

As previously, the spindle or stud axle 53 of the wheel is driven by a shaft 54 provided with two universal joints 55 and 56, but here the shaft 54 is telescopic; the spindle pivot passes through a bearing 58, fixed to the body, oscillating about an axis or supported by a ball-and-socket joint, and through a ring 59, placed near the spindle, in which it can rotate without sliding. The ring 59 is rigidly connected to two cross-pieces 60 and 61 supported by bearings 62 and 63, secured to the body, in which they can rotate.

It is useful but not necessary for the two bearings 62 and 63 to be able to be aligned with the centre of the universal joint 55; this leads to placing the bearing 62 on the casing 12 of the front axle as is shown in the figure.

Raising is effected by means of the cross-pieces 60 and 61 or by means of only one of them and the rotary movement which is effected about an axis passing through the bearings 62 and 63 is the same as previously.

Figure 10:
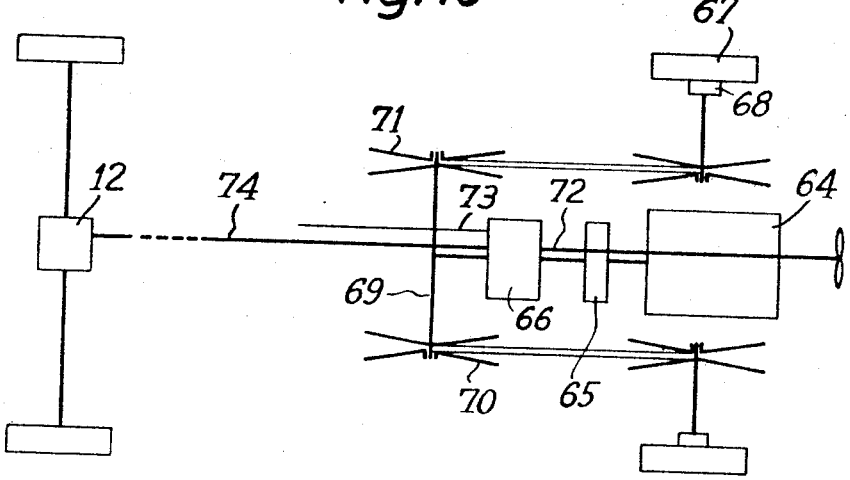
FIGURE 10 shows a diagram of a suitable drive means.

FIGURE 10 shows a diagram of a suitable drive means for the vehicle.

A motor 64, preferably air cooled, is located at the rear of the vehicle and, by means of a clutch 65 and a gear box or transfer box 66, the drive is transmitted to a continuously variable speed changer operating by belts and pulleys which drives the rear wheels 67 that include reducing gears 68.

The gear box or transfer box 66 which will be described in greater detail later, has several functions.

It forms a reduction stage between the engine and the shaft 69 which drives two drive pulleys 70 and 71 of the speed changer and it includes a reverse, permitting travel in both forward and rearward direction.

It also has a power take-off shaft 72 to drive the propeller or any other component as well as an input shaft 73 which, extending into the driver's cabin, allows the engine to be started from inside the vehicle.

It also comprises a device, which, by means of a shaft 74, allows the driver to drive the front wheels when the vehicle runs at a speed lower than a predetermined speed. A device of this type will be described at the same time as the gear box or transfer box 66.

The shaft 74 is connected to the front axle, essentially constituted by a differential and enclosed in the casing 12.

The use of a speed changer which can for example be of the type preferably having a conventional gear box, presents numerous advantages in the case of an amphibious vehicle. In particular, due to the fact that for each drive wheel, the gear reduction automatically takes, at each instant, the value best adapted to the torque and to the resistant torque at this instant, and the best conditions for difficult clearings are fulfilled without the driver having to intervene.

In addition, this use of a speed changer brings about significant gain in weight when the vehicle moves over water.

FIGURE 11 schematically shows the gear box or transfer box 66. It is essentially constituted by three gears 75, 76 and 77 and by a bevel gear pair 78 as well as by another gear 79 (not shown in FIGURE 11 but only in FIGURE 12, for greater clarity of the drawing).

The gear 75 is mounted so as to be fixed in rotation but axially movable on a shaft 80 driven by the engine by means of the clutch; the shaft 80 can be extended at 87, as shown in FIGURE 11. In this figure, the gear 75 is shown in the position corresponding to "neutral" in which position it cannot engage gear 76. By placing the gear 75 into the position shown in dotted lines, said pinion engages gear 76, which, by means of the shaft 81, drives the bevel gear pair 78 which, in turn, drives the shaft 82 which carries the two drive pulleys of the speed changer.

The gear 77 is mounted so as to be fixed in rotation but axially movable on a shaft whose end 83 drives the front axle by means of the direct-drive dog-clutch 84 and whose end 85 drives the propeller by means of the direct-drive dog clutch 86.

As shown in FIGURE 12 which schematically shows a view along the line XII—XII of FIGURE 11, the gear 79 is mounted so as to be fixed in rotation but axially movable on a shaft 88 which is not situated in the same plane as the shaft carrying the gears 75, 76 and 77 and its sliding enables it to engage the two gears 75 and 76 at the same time.

The shaft 87 which can extend into the driver's cabin enables the engine to be started up and set into operation without leaving the vehicle, this being important on certain occasions, for example when the vehicle is afloat.

The assembly of the two gears 75 and 76 which transmits the movement of the motor to the speed changer, forms a reduction stage whose ratio is chosen so that the drive pulleys of the changer rotate at speeds included between favourable limits. It is by this assembly of gears 75 and 76 that the rear wheels, which are the main driving wheels, are actuated.

When transmission main drive gear 75 is disengaged from countershaft drive gear 76, the reverse double width idle gear 79 may be shifted and engaged with drive gear 75 and countershaft drive gear 76.

When the gear 77 slides into engagement with the gear 76, the propeller is driven if the direct-drive dog-clutch 86 is engaged and the front axle is driven if the direct-drive dog clutch 84 is disengaged.

It will be noted that, by reason of the continuously variable speed changer, the transmission ratio of the gear drive is automatically set at the desired level, this rendering the incorporation or a differential between the front axle and the gear 77 unnecessary.

According to a particular embodiment, the sliding of the pinion 77 is automatically controlled by separating the flanges of a pulley of the changer so that, up to a certain speed, this speed corresponding to this separation of the flanges, the gear 77 comes into engagement with the gear 76. As the engagement and disengagement of the direct-drive dog-clutch 84 is at the disposal of the driver, the front transmission is driven only when the driver desires.

I claim:

1. An amphibious vehicle including a body having mountings for front wheels and rear wheels, wherein the mountings for the rear wheels are accommodated in housings of appropriate size to allow the rear wheels to be raised and lowered whilst remaining in the same plane, means being provided for effecting the raising and lowering movements, said body having a front end with inclined parts, and wherein means are provided to raise the front wheels with a composite rotational movement to apply said front wheels against said inclined body parts.

2. A vehicle according to claim 1, including front wings, wherein means are provided to move said front wings at the same time as the front wheels.

3. A vehicle according to claim 1, wherein deflectors are mounted on the rear of said body and wherein means are provided to move said deflectors manually independently to control steering of the vehicle when afloat.

4. A vehicle according to claim 1, wherein said body has a front casing or compartment forming a stem to divide the water when the vehicle is afloat, said casing containing front wheel drive means.

5. A vehicle according to claim 1, wherein said body decreases in width from front to rear.

6. A vehicle according to claim 1, wherein the base of the body is concave in shape.

7. A vehicle according to claim 1, incorporating a continuously variable speed changer employing belts and pulleys and means are provided to drive the front road wheels if the vehicle speed falls below a predetermined speed, said means including means for displacing one of the flanges of said pulleys.

8. A vehicle according to claim 1, wherein each front wheel is mounted on a pivoted shaft.

References Cited

UNITED STATES PATENTS

| | | | |
|---|---|---|---|
| 933,426 | 9/1909 | Frost | 114—62 |
| 1,710,869 | 4/1929 | Farrell | 115—1 X |
| 3,176,585 | 4/1965 | Ruf | 115—1 X |
| 3,280,785 | 10/1966 | Mycroft | 115—1 |

ANDREW H. FARRELL, *Primary Examiner.*